F. L. TIBBETTS.
PIPE COUPLING.
APPLICATION FILED DEC. 15, 1919.
1,398,083.
Patented Nov. 22, 1921.
2 SHEETS—SHEET 1.
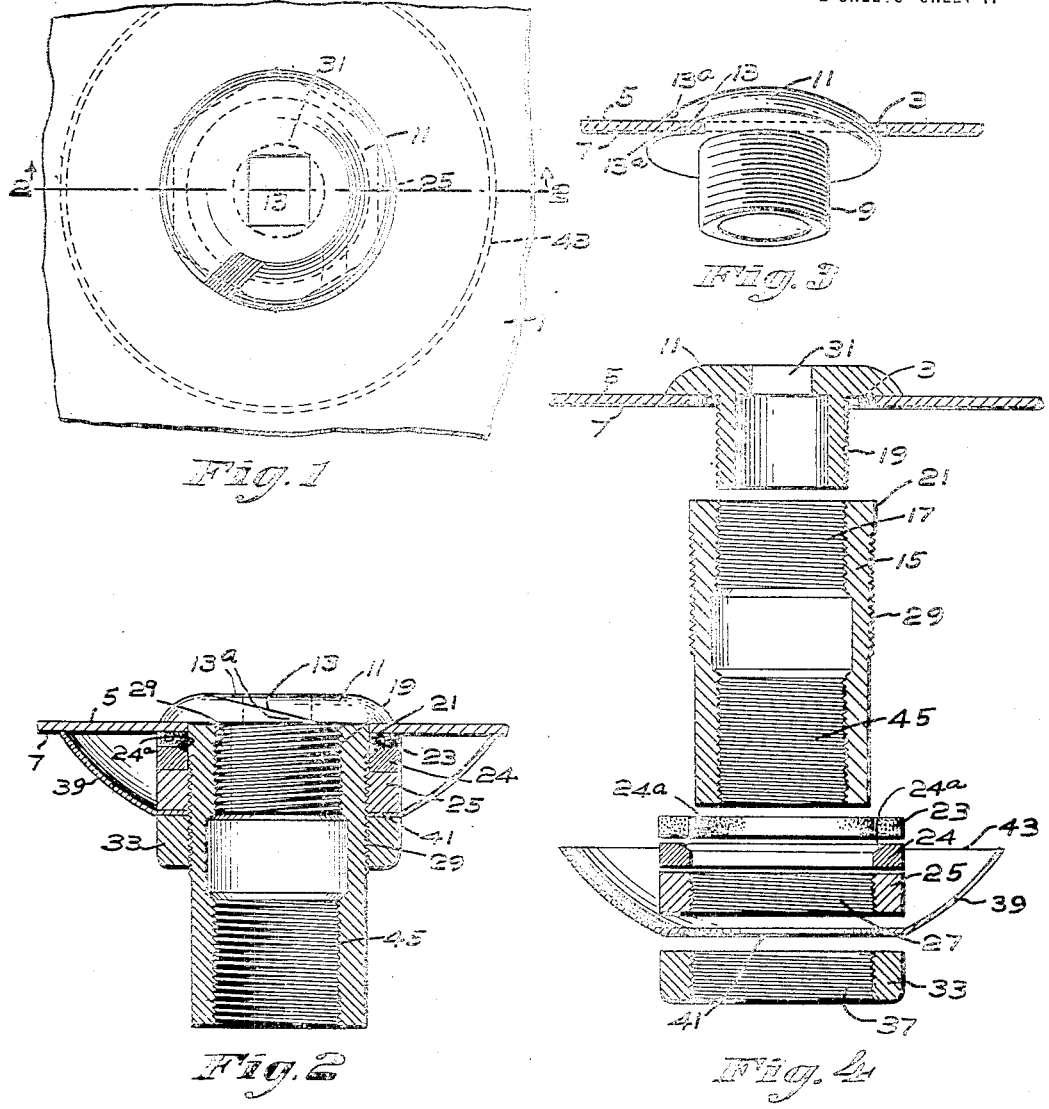
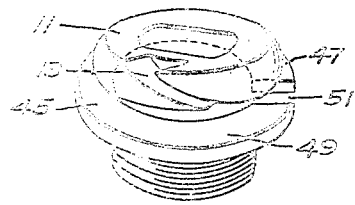
Inventor:
Frank L. Tibbetts
By Robt. F. Maire
Attorney

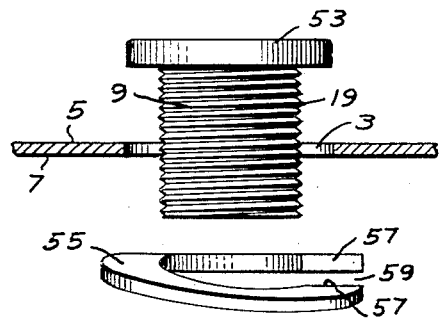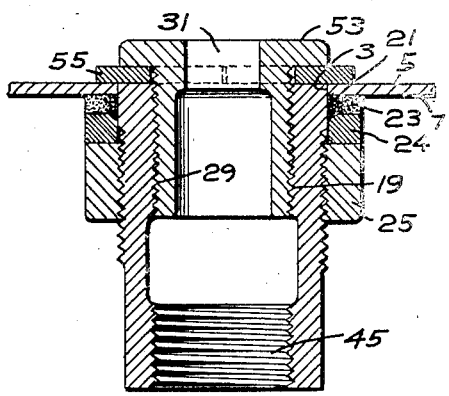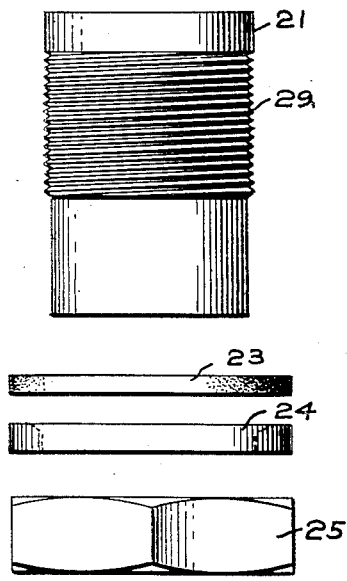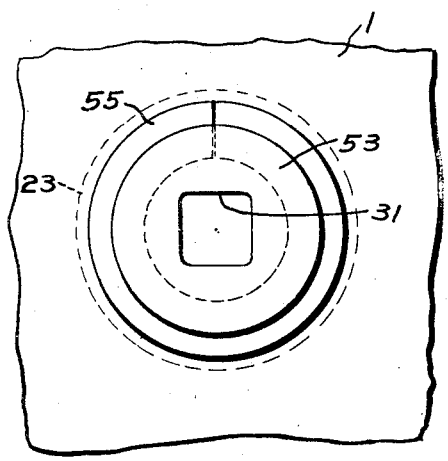

UNITED STATES PATENT OFFICE.

FRANK L. TIBBETTS, OF SOMERVILLE, MASSACHUSETTS, ASSIGNOR, BY MESNE ASSIGNMENTS, TO ELMER S. STACK, OF SOMERVILLE, MASSACHUSETTS.

PIPE-COUPLING.

1,398,083.  Specification of Letters Patent.  Patented Nov. 22, 1921.

Application filed December 15, 1919. Serial No. 344,814.

*To all whom it may concern:*

Be it known that I, FRANK L. TIBBETTS, a citizen of the United States, residing at Somerville, in the county of Middlesex and State of Massachusetts, have invented an Improvement in Pipe-Couplings, of which the following description, in connection with the accompanying drawings, is a specification, like characters on the drawings representing like parts.

The invention to be hereinafter described relates to couplings for attaching pipes or other devices to plates, such, for example, as plates of boilers and tanks.

It is frequently desirable to attach devices to plates of boilers or tanks when the interiors thereof are not conveniently accessible. For example, after a domestic hot water tank has been installed and in use, it may be desired to apply a gas heater thereto. This is usually done by disconnecting the piping for the tank and coupling the piping for the gas heater to such piping. This is not only an inconvenient operation and an undesirable way to connect the heater with the tank, but also it requires an objectionable length of piping to be used.

One of the purposes of the present invention, therefore, is to provide a simple and efficient coupling which may be applied directly to the tank to connect the heater piping thereto at any point desired, without disconnecting the piping already in place or dismantling the tank. As a result, the heater may be desirably connected to the tank for most efficient effect and with the use of a minimum amount of piping.

With the aforesaid and other objects in view, the character of the invention may be best understood by reference to the following description of good forms thereof shown in the accompanying drawing, wherein:

Figure 1 is a face view of a portion of a plate having a coupling embodying the invention attached thereto;

Fig. 2 is a section taken on line 2—2 of Fig. 1;

Fig. 3 is a sectional detail showing the head of the neck of the coupling in process of entering from one side of the plate through the hole therein to the opposite side of the plate;

Fig. 4 is a sectional view showing the parts of the coupling before assembly thereof;

Fig. 5 is a view of a modified form of coupling member;

Fig. 6 is a view showing parts of a slightly different form of coupling before assembly thereof;

Fig. 7 is a section through the coupling shown in Fig. 6 connected to a plate; and Fig. 8 is a face view of the construction shown in Fig. 7.

Referring to the drawing, the coupling device may be applied to a plate for a boiler, tank or other purpose, and in the present instance, a portion 1 of a thin sheet metal plate is shown having a hole 3 therein, an interior surface 5 and an exterior surface 7.

The coupling may comprise a neck 9 substantially smaller than the plate opening 3, and a head or flange 11 substantially larger than the opening 3. An important feature of the invention is the construction of the head whereby it may be presented to the outer face of the plate 7 and inserted through the hole 3 to the opposite face of the plate. To accomplish this, in the present instance, the head 11 has a slot or kerf 13 formed therein oblique to the plane of the head. To insert the head through the opening, the flange is presented to the margin of the plate surrounding said opening, and is laterally adjusted thereon until the bottom of the kerf or slot engages the edge of the hole. Then the neck may be manipulated by a rotative or screw motion or other suitable motion to cause the flange or head to pass from one side of the plate through the opening to the opposite side of the plate.

As stated, the neck 9 is smaller than the hole in the plate. The present invention contemplates the provision of means for centering the neck with respect to the opening, in order that the flange or head may be centered with respect to the opening, and overlap a substantial margin of the plate surrounding the opening throughout the circumference of the flange. This means, in the present instance of the invention, comprises a sleeve 15 having an internal thread 17 adapted to be screwed onto an external thread 19 on the neck. The external diameter of the sleeve 15 may equal the diameter of the hole in the plate, and the inner end portion 21 of the sleeve may be smooth substantially as indicated in Fig. 4. The construction is such that the sleeve 15 may be screwed onto the neck until the smooth end portion 21 thereof fits into the hole in the plate, and the end of the sleeve engages the inner face of the flange of the neck.

It is desirable that the flange or head shall be pressed intimately against the inner surface of the plate, and in the present instance, this is accomplished by presenting a member to the opposite face of the plate and gripping the plate tightly between them. To this end a washer 23 of lead or other suitable packing material may be provided having an internal diameter such that it may readily slip over the sleeve and engage the face of the plate. Then a metal ring 24 having an internal chamfer 24ᵃ may be slipped along the neck into engagement with the washer. A nut 25 may be provided having an internal thread 27 adapted to be screwed onto an external thread 29 on the sleeve. The construction is such that the nut 25 may be adjusted along the sleeve to press the ring against the washer 23 and the latter into engagement with one face of the plate. This action will draw the head of the neck into tight engagement with the opposite face of the plate. Thus, any possibility of leakage through the hole in the plate is prevented. To prevent rotation of the neck while the sleeve is being screwed thereon, the portion 31 of the bore of the neck may be squared so that a bar or other suitable tool may be inserted therein through the sleeve 15. This will readily serve to prevent rotation of the neck while the sleeve is screwed thereon.

The coupling described may be used for connection with thin, flexible plates, and in some instances it may be desirable to provide means to prevent rocking of the coupling with respect to the plate. To accomplish this, in the present instance, a member 39 is provided conveniently of dished form having a hole 41 in the center thereof adapted to fit upon the sleeve 15, and a rim 43 adapted to engage the outer face of the plate at a substantial distance from the hole therein. This member may be confined between the adjusting nut 25 and a lock nut 33 having the internal threads 37, and the member 39 and may be of a resilient or yielding character, so that when the lock nut 33 is tightened into place, it will press the rim 43 securely against the plate. Since the rim engages the plate a substantial distance from the hole in the plate, it will effectively prevent rocking of the coupling with respect to the plate, and will prevent any movement of the coupling such as to disturb its efficient, tight connection with the plate.

When the plate is clamped between the flange of the neck and the washer 23, the clamping pressure may be sufficient to cause the lips 13ᵃ at the opposite sides of the kerf 13 of the head to close together, and thus the flange will be in effect continuous throughout the circumference thereof, and the flange will have contact with the margin of the plate surrounding the hole therein throughout the extent of the margin, and further contribute to prevent leakage through the hole.

Referring to Fig. 5, the device there shown may be similar to the neck and flange already described, with the exception that a split collar 45 is provided on the neck having a portion 47 secured to the flange, and a laterally deflected or flexible portion 49 free from said flange and tending to stand outward therefrom. The split 51 in the collar occurs at a point circumferentially offset from the kerf in the neck flange. The construction is such that the flange and collar may be inserted through the hole in the plate and when the flange is drawn toward the plate, the flexible portion of the collar will be pressed toward the flange and the collar will so engage the plate as to provide a uniform backing against the plate and insure proper pressure of the packing ring against the plate and prevent leakage between them.

Referring to Figs. 6, 7 and 8, the coupling there shown is similar in certain respects to the forms already described, with the exception that the head 53 of the neck is sufficiently small to enter through the hole in the plate, and a split collar 55 is provided having laterally bent or offset end portions 57 providing a wide opening 59. The collar fits loosely on the neck and has an external diameter substantially greater than the diameter of the hole in the plate.

To assemble the parts of this coupling with the plate, the head of the neck is inserted through the hole in the plate, the collar is slid onto the neck and its opening 59 is presented to the margin of the plate surrounding the hole therein. This may be readily accomplished since the neck is smaller than the hole in the plate and can be moved to a position eccentric to said hole to allow the outer edge of the collar to be presented to the inner edge of said hole. Then the collar is manipulated or given a screw motion to enable it to pass through the hole in the plate to the rear of the latter. The sleeve 15 may then be screwed onto the neck and enter the hole in the plate to center the neck head and collar with respect to said hole. When the nut, washer and packing ring are adjusted along the sleeve to the front face of the plate and tightened the offset end portions 57 of the collar will be flattened in to the same plane and uniformly seat against a substantial margin surrounding the hole in the plate and prevent the head from being pulled through the hole and the packing ring will be securely pressed against the plate so as to prevent any possibility of leakage between them.

Various devices or instrumentalities may be connected to the coupling, in the present instance, it is shown as provided with an internal thread 45 adapted to have a pipe screwed thereto.

By my invention there is provided a simple and efficient coupling which may be readily connected to plates of tanks, boilers, and the like from the exterior thereof, without necessity for access to the interior thereof. The members of the coupling at opposite sides of the plate will have intimate engagement therewith, and may be of ample width to overlap the margin of the plate surrounding the hole therein a substantial extent, and prevent any possibility of leakage through the hole.

It will be understood that the invention is not limited to the specific embodiment shown, and that various deviations may be made therefrom without departing from the spirit and scope of the appended claims.

What is claimed is:—

1. A coupling for attaching devices to plates, comprising, in combination, a neck for insertion through a hole in the plate substantially larger than said neck, a flange on said neck substantially larger than the hole in the plate and having a kerf oblique to the plane of said flange for threaded engagement with the margin of the plate surrounding said hole to enable the flange to pass through said hole from one side of the plate to the other on a rotary screw motion of said flange, a sleeve threaded to said neck having an end portion adapted to fit in the hole in the plate to center the neck and flange with respect to said hole, a washer on said sleeve for engagement with the side of said plate opposite to said flange, and a nut threaded to said sleeve for holding the margin of the plate surrounding the hole therein tightly between said flange and washer.

2. A coupling for attaching devices to plates, comprising, in combination, a neck for insertion through a hole in a plate substantially larger than said neck, a flange on said neck substantially larger than said hole and having provision permitting insertion of said flange through said hole from one side of said plate to the opposite side thereof, a sleeve threaded on said neck adapted to fit into said hole to center the flange with respect to said hole, and a member threaded to said sleeve adjustable along said sleeve to hold the margin of the plate surrounding said hole tightly between said flange and member.

3. A coupling for attaching devices to plates, comprising, in combiantion, a neck having a head with provision for insertion of the head through a hole in a plate smaller than said head, said neck being smaller than said hole, a sleeve on said neck adapted to fit into said hole to center the head with respect to said hole, and a member on said neck for engagement with the opposite side of said plate from said head.

4. A coupling for attaching devices to plates, comprising, in combination, a neck having a member with provision enabling the same to be inserted through a hole in a plate smaller than said member, said neck being smaller than the hole in said plate, a member on said sleeve adapted to fit into said hole to fill the space between said neck and the edge of the hole, and a member for engagement with the opposite side of said plate from said neck member to clamp the margin of the plate surrounding said hole tightly between them.

5. A coupling for attaching devices to plates, comprising, in combination, a neck for insertion through a hole in a plate substantially larger than said neck, a flange on said neck substantially larger than the hole in the plate and having a slit therein oblique to the plane of said flange for threaded engagement with the margin of the plate surrounding said hole to enable the flange to pass through said hole from one side of the plate to the other on a rotary screw motion of said flange, a sleeve threaded to said neck having an end portion adapted to fit in the hole in the plate to center the neck and flange with respect to said hole, a washer on said sleeve for engagement with the side of the plate opposite said flange, an adjusting nut on said sleeve to clamp said flange and washer against the plate, and a lock nut on said sleeve for securing said adjusting nut in position.

6. A coupling for attaching devices to plates, comprising, in combination, a neck having a flange for insertion through a hole in a plate smaller than said flange, said neck being smaller than the hole in said plate, a sleeve threaded to said neck and adapted to fill the space between said neck and hole, said neck having provision to receive a tool to prevent rotation of said neck when the sleeve is screwed thereon, and a member mounted on said sleeve adapted to be clamped against the opposite side of said plate from said flange.

7. A coupling for attaching devices to plates, comprising, in combination, a neck having a flange with a kerf therein oblique to the plane of said flange, a split collar having a laterally deflected flexible portion, and the split of the collar circumferentially offset from said kerf, the kerf of said flange and split of said collar being adapted to receive the margin of a plate surrounding the hole therein to enable the flange and collar to pass through said hole, and a member on the neck for location at the opposite side of the plate from said flange and collar to clamp the plate between them and flatten the collar into engagement with the plate.

8. A coupling for attaching devices to plates, comprising, in combination, a neck having a head adapted to pass through a hole in a plate, a split collar on said neck larger than the hole in the plate, the neck being smaller than the hole in the plate to enable manipulation of the collar to allow passage thereof through said hole, a sleeve on said neck adapted to enter said hole and center the neck and collar with respect to said hole, and a member on said sleeve for engagement with the opposite side of the plate from said collar.

9. A coupling for attaching devices to plates, comprising, in combination, a neck having a head adapted to pass through a hole in a plate, a split collar larger than the hole in the plate, said neck being smaller than the hole in the plate and movable relatively to said hole to enable manipulation of said collar to allow passage thereof through said hole, a packing member for engagement with said plate, a sleeve on said neck adapted to enter said hole, and means to secure said parts in assembled relation with respect to said plate.

10. A device for attachment to plates, comprising, in combination, a neck having a head adapted to pass through a hole in a plate, a split collar larger than the hole in the plate, said neck being smaller than the hole in the plate to facilitate movement of said collar through said hole, a sleeve on said neck adapted to enter said hole and occupy the space between said neck and hole, and means to secure said parts in assembled relation with respect to said plate.

11. A device for attachment to plates comprising a neck for insertion through a hole in the plate larger than said neck, a collar larger than said hole and having provision enabling it to move from one side of said plate through the hole to the opposite side of said plate, said collar being formed to engage the entire margin of the plate surrounding the hole therein, to prevent leakage of fluid between the collar and margin, a sleeve on said neck occupying the space between said neck and hole, and means to hold said collar tight against said plate.

In testimony whereof, I have signed my name to this specification.

FRANK L. TIBBETTS.